US012692422B2

(12) United States Patent
Lei et al.

(10) Patent No.: US 12,692,422 B2
(45) Date of Patent: Jul. 28, 2026

(54) ELASTIC ANTI-CORROSION ADHESIVE, ELASTIC ANTI-CORROSION ADHESIVE TAPE AND PREPARATION METHOD THEREOF

(71) Applicant: ANCORRO CO., LTD., Chengdu (CN)

(72) Inventors: Jian Lei, Chengdu (CN); Yu Zhang, Chengdu (CN); Hong Jiang, Chengdu (CN); Yayong Wang, Chengdu (CN); Xiaolong Song, Chengdu (CN)

(73) Assignee: ANCORRO CO., LTD., Chengdu (CN)

( * ) Notice: Subject to any disclaimer, the term of this patent is extended or adjusted under 35 U.S.C. 154(b) by 147 days.

(21) Appl. No.: 18/702,711

(22) PCT Filed: Dec. 9, 2022

(86) PCT No.: PCT/CN2022/137940
§ 371 (c)(1),
(2) Date: Apr. 18, 2024

(87) PCT Pub. No.: WO2023/116465
PCT Pub. Date: Jun. 29, 2023

(65) Prior Publication Data
US 2024/0409793 A1      Dec. 12, 2024

(30) Foreign Application Priority Data

Dec. 20, 2021    (CN) .......................... 202111564898.1

(51) Int. Cl.
*C09J 123/22* (2006.01)
*C09J 7/29* (2018.01)
(Continued)

(52) U.S. Cl.
CPC .............. *C09J 123/22* (2013.01); *C09J 7/29* (2018.01); *C09J 11/04* (2013.01); *C09J 11/08* (2013.01);
(Continued)

(58) Field of Classification Search
CPC .......... C08L 23/14; C08L 23/22; C08L 23/16; C08L 67/00; C09J 123/22; C09J 2423/00
See application file for complete search history.

(56) References Cited

FOREIGN PATENT DOCUMENTS

CN      101935500 A  *  1/2011
CN      110872477 A     3/2020
(Continued)

OTHER PUBLICATIONS

The Physical Properties of Polypropylene Fibers News website (Dec. 13, 2021, https://www.weavertex.com/news/the-physical-properties-of-polypropylene-fiber-52415429.html (Year: 2021).*
(Continued)

*Primary Examiner* — Mark S Kaucher
(74) *Attorney, Agent, or Firm* — Getech Law LLC; Jun Ye

(57) ABSTRACT

The present invention discloses an elastic anti-corrosion adhesive, an elastic anti-corrosion adhesive tape and a preparation method thereof, which belongs to the technical field of anti-corrosion adhesive tape materials, comprising: by weight, 5 to 8 parts of elastic rubber, 3 to 5 parts of high molecular weight polyisobutylene, 20 to 35 parts of medium molecular weight polyisobutylene, 5 to 10 parts of elastic fiber, 40 to 60 parts of inorganic powder and 1 to 5 parts of anti-aging agent. The elastic anti-corrosion adhesive provided by the present invention possesses excellent extensibility and resilience. The extensibility thereof allows it to be applied to irregular surfaces, forming a tight bond with the substrate surface, and reducing voids. And the resilience thereof gives the anti-corrosion adhesive self-tightening properties, promoting its penetration into the microscopic surface of the substrate, effectively isolating air and moisture, thereby enhancing its corrosion resistance.

9 Claims, 1 Drawing Sheet

(51) Int. Cl.
C09J 11/04 (2006.01)
C09J 11/08 (2006.01)

(52) U.S. Cl.
CPC .... *C09J 2301/122* (2020.08); *C09J 2301/206*
(2020.08); *C09J 2301/408* (2020.08)

(56) References Cited

FOREIGN PATENT DOCUMENTS

| CN | 212269969 U | 1/2021 | |
| CN | 112760060 A * | 5/2021 | ............... C09J 7/30 |

OTHER PUBLICATIONS

CN202111564898.1—Notice of First Examination Opinion mailed on Sep. 13, 2022, 22 pages.
CN202111564898.1—Second Review Opinion Notice mailed on Dec. 14, 2022, 16 pages.

* cited by examiner

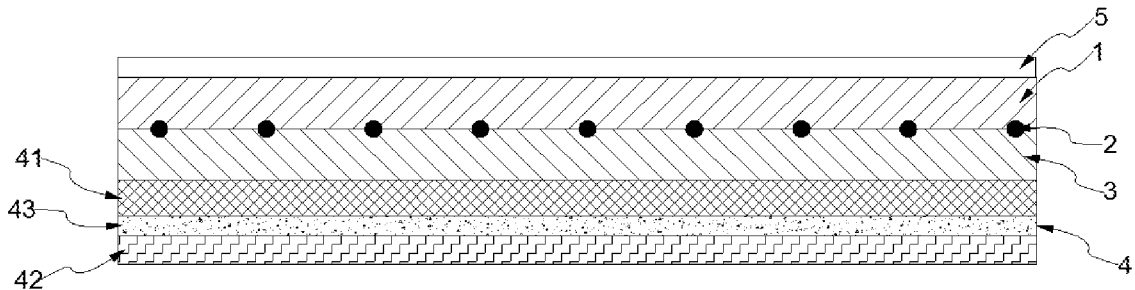

ELASTIC ANTI-CORROSION ADHESIVE, ELASTIC ANTI-CORROSION ADHESIVE TAPE AND PREPARATION METHOD THEREOF

REFERENCES TO RELATED APPLICATIONS

This application is a 371 of International Patent Application PCT/CN2022/137940, filed Dec. 9, 2022, which claims priority to the rights and interests of the Chinese invention patent application No. CN202111564898.1 submitted to the State Intellectual Property Office of the People's Republic of China on Dec. 20, 2021, the entire contents of which are hereby incorporated into this paper by reference.

TECHNICAL FIELD

The present invention relates to the technical field of anti-corrosion adhesive tape materials, and in particular to an elastic anti-corrosion adhesive, an elastic anti-corrosion adhesive tape and a preparation method thereof.

BACKGROUND TECHNOLOGY

Currently, conventional anti-corrosion adhesive tapes mainly consist of cold wrap tapes and viscoelastic anti-corrosion adhesive tapes. Cold wrap tapes include polyethylene cold wrap tape, polypropylene cold wrap tape, etc. These cold wrap tapes lack flexibility and can only be used for wrapping and covering pipelines, making it difficult to effectively adhere to irregular surfaces of certain facilities. Additionally, cold wrap tapes are generally thick, with noticeable steps between layers at overlapping areas, and they do not have the capability to fully fill these gaps, resulting in the formation of voids between the tape and the substrate surface. This allows air and moisture to penetrate, leading to corrosion of the substrate surface.

Viscoelastic anti-corrosion adhesive tapes, although possessing unique cold flow characteristics and excellent corrosion sealing properties, lack resilience and are challenging to apply to irregular surfaces of facilities. Moreover, they require additional application of outer protective wraps to enhance their cold flow effect and improve corrosion sealing, making the construction process more complex.

SUMMARY OF THE INVENTION

The present invention is aimed to provide an elastic anti-corrosion adhesive, an elastic anti-corrosion adhesive tape, and a preparation method thereof to solve the problem that the existing anti-corrosion adhesive tapes are unsuitable for use in irregular facilities. The technical solution to solve the above-mentioned technical problem is as follows:

An elastic anti-corrosion adhesive, comprising the following components: by weight, 5 to 8 parts of elastic rubber, 3 to 5 parts of high molecular weight polyisobutylene, 20 to 35 parts of medium molecular weight polyisobutylene, 5 to 10 parts of elastic fiber, and 40 to 60 parts of inorganic powder and 1 to 5 parts of anti-aging agent.

Further, the elastic rubber comprises EPDM rubber and/or butyl rubber.

Further, the molecular weight of the high molecular weight polyisobutylene is 80,000 to 90,000.

Further, the molecular weight of the medium molecular weight polyisobutylene is 30,000 to 50,000.

Further, the elastic fibers comprise polyolefin elastic fibers and/or polyester composite elastic fibers.

Further, the inorganic powder comprises: one or more of calcium carbonate, barium sulfate, mica powder, talc powder, wollastonite powder and kaolin.

The present invention also provides a method for preparing the above-mentioned elastic anti-corrosion adhesive, which comprises the following steps:

mixing elastic rubber, high molecular weight polyisobutylene, medium molecular weight polyisobutylene, elastic fiber, inorganic powder and anti-aging agent at a temperature below 130° C. for 1 to 4 hours to obtain an elastic anti-corrosion adhesive.

The invention also provides an elastic anti-corrosion adhesive tape, comprising: a first elastic anti-corrosion adhesive layer, an elastic reinforcing rib, a second elastic anti-corrosion adhesive layer and a composite backing layer arranged in sequence; wherein the first elastic anti-corrosion adhesive layer and the second elastic anti-corrosion adhesive layer are made of the above-mentioned elastic anti-corrosion adhesive;

Wherein, the elastic reinforcing rib comprises: a plurality of tows, which are laid between the first elastic anti-corrosion adhesive layer and the second elastic anti-corrosion adhesive layer in a parallel and spaced manner along the longitudinal direction of the elastic anti-corrosion adhesive tape.

The tows comprise: polyolefin elastic fiber bundles or polyester composite elastic fiber bundles.

Further, in the elastic anti-corrosion adhesive tape, the composite backing layer comprises: a first backing layer and a second backing layer, wherein the first backing layer and the second backing layer are bonded by the bonding layer, and the first backing layer is provided on the side of the second elastic anti-corrosion adhesive layer away from the first elastic anti-corrosion adhesive layer.

Further, in the elastic anti-corrosion adhesive tape, the elastic anti-corrosion adhesive tape further comprises an anti-adhesion isolation layer which is provided on the side of the first elastic anti-corrosion adhesive layer away from the second elastic anti-corrosion adhesive layer.

The invention has the following beneficial effects:

1. The elastic anti-corrosion adhesive of the present invention possesses excellent extensibility and resilience. The extensibility enables it to be applied to irregular shaped parts to form a tight bond with the surface of the base material, thus reducing void; the resilience can enable the anti-corrosion adhesive to possess self-tightening force, facilitating the penetration of the adhesive into the microscopic surface of the substrate, thoroughly isolating air and moisture, and improving the corrosion resistance performance.

2. The elastic anti-corrosion adhesive of the present invention employs polyisobutylene to provide excellent adhesion, while elastic rubber and elastic fibers contribute to its resilience, endowing the adhesive with adhesive, extensibility, and resilience properties. The medium molecular weight polyisobutylene used ranges from 30,000 to 50,000, possessing superior air tightness, waterproofness, and adhesion, and exhibiting good compatibility with other components, thereby providing a foundation for the overall performance of the anti-corrosion adhesive. Additionally, high molecular weight polyisobutylene with a molecular weight of 80,000 to 90,000 enhances the cohesion within the adhesive layer, thus improving resilience.

3. The elastic anti-corrosion adhesive tape of the present invention demonstrates excellent extensibility, capable of being stretched to 1.5 to 2 times its original length. Through stretching and wrapping, it tightly adheres to the surface of the workpiece, forming a strong bond, exhibiting high peel strength, and delivering effective corrosion protection.

4. The elastic anti-corrosion adhesive tape of the present invention utilizes elastic reinforcement rib to enhance the overall structural strength and resilience of the adhesive tape. The elastic reinforcement rib possesses high resilience, providing self-tightening force to the adhesive tape during use. This allows the adhesive layer to more easily penetrate the microscopic surface of the corrosion-resistant workpiece, forming a strong adhesive layer and filling the gaps between the adhesive layer and the workpiece, thereby improving sealing and completely isolating air and moisture from contacting the corrosion-resistant workpiece, thus enhancing the corrosion resistance. Additionally, with such excellent self-tightening force, it also helps to improve the bonding force between the elastic anti-corrosion adhesive tape and the corrosion-resistant workpiece, increasing the degree of integration between them, thus enhancing the peel strength of the elastic anti-corrosion adhesive tape.

5. The elastic anti-corrosion adhesive tape of the present invention utilizes a double-layer structure of stretchable backing material for the composite backing layer. The purpose of this is to allow the adhesive layer to penetrate the surface of the backing layer without causing adhesive overflow, and to enable self-fusion with the adhesive layer at the overlap joint, effectively solving the problem of water seepage at the overlap joint. Furthermore, it endows the tape with paintability functionality. The surface of the second layer of the composite backing material can be coated with functional coatings as needed, and provide aesthetic, protective, and weather-resistant properties at the same time.

DESCRIPTION OF THE DRAWINGS

In order to provide a clearer explanation of the technical solutions of the

Embodiments of the present invention, a brief introduction to the drawings used in the Embodiments will be provided below. It should be understood that the following drawings only illustrate some Embodiments of the present invention and should not be considered as limiting the scope. Ordinary technicians in this field can also obtain other related drawings without exerting creative effort.

FIG. 1 shows a diagram of the structure of the elastic anti-corrosion adhesive tape of the present utility model. In the drawing, 1—First elastic anti-corrosion adhesive layer, 2—elastic reinforcement rib, 3—Second elastic anti-corrosion adhesive layer, 4—composite backing layer, 41—First backing layer, 42—Second backing layer, 43—bonding layer, 5—anti-adhesive isolation layer.

SPECIFIC IMPLEMENTATION METHOD

The following description of the principles and features of the present invention is combined with Embodiments and drawings. The Embodiments provided are only used to explain the present invention and are not intended to limit the scope of the present invention. For parts that specific conditions are not specified in the Embodiments, conventional conditions or conditions recommended by manufacturers are used. Reagents or instruments not specified by manufacturers are conventional products that can be obtained through commercial purchase.

Embodiment 1

The elastic anti-corrosion adhesive in this Embodiment comprises: by weight, 5 parts of elastic rubber, 3 parts of high molecular weight polyisobutylene, 25 parts of medium molecular weight polyisobutylene, 6 parts of elastic fibers, 55 parts of inorganic powder, and 2 parts of anti-aging agent, which are mixed at 110° C. for 4 hours.

Wherein, the elastic rubber is a mixture of ternary ethylene-propylene rubber and butyl rubber in equal proportions; the molecular weight of the high molecular weight polyisobutylene is 80,000; the molecular weight of the medium molecular weight polyisobutylene is 30,000; the elastic fibers are a mixture of polyolefin elastic fibers and polyester composite elastic fibers in equal proportions; the inorganic powder is a mixture of calcium carbonate, barium sulfate, mica powder, and talcum powder in equal proportions; the anti-aging agent is a hindered phenolic binary antioxidant.

Embodiment 2

The elastic anti-corrosion adhesive in this example comprises: by weight, 8 parts of elastic rubber, 5 parts of high molecular weight polyisobutylene, 20 parts of medium molecular weight polyisobutylene, 10 parts of elastic fibers, 60 parts of inorganic powder, and 2 parts of anti-aging agent, which are mixed at 120° C. for 2.5 hours.

Wherein, the elastic rubber is a mixture of ternary ethylene-propylene rubber and butyl rubber in equal proportions; the molecular weight of the high molecular weight polyisobutylene is 90,000; the molecular weight of the medium molecular weight polyisobutylene is 50,000; the elastic fibers are a mixture of polyolefin elastic fibers and polyester composite elastic fibers in equal proportions; the inorganic powder is a mixture of calcium carbonate, barium sulfate, mica powder, and talcum powder in equal proportions; the anti-aging agent is a hindered phenolic binary antioxidant.

Embodiment 3

The elastic anti-corrosion adhesive in this Embodiment comprises: by weight, 6 parts of elastic rubber, 4 parts of high molecular weight polyisobutylene, 20 parts of medium molecular weight polyisobutylene, 8 parts of elastic fibers, 58 parts of inorganic powder, and 2 parts of anti-aging agent mixed at 130° C. for 1 hour.

Wherein, the elastic rubber is a mixture of ternary ethylene-propylene rubber and butyl rubber in equal proportions; the molecular weight of the high molecular weight polyisobutylene is 85,000; the molecular weight of the medium molecular weight polyisobutylene is 45,000; the elastic fibers are a mixture of polyolefin elastic fibers and polyester composite elastic fibers in equal proportions; the inorganic powder is a mixture of calcium carbonate, barium sulfate, mica powder, and talcum powder in equal proportions; the anti-aging agent is a hindered phenolic binary antioxidant.

Embodiment 4

The elastic anti-corrosion adhesive in this example includes: by weight, 5 parts of elastic rubber, 3 parts of high molecular weight polyisobutylene, 10 parts of medium molecular weight polyisobutylene, 5 parts of elastic fibers, 40 parts of inorganic powder, and 1 part of anti-aging agent mixed at 125° C. for 1 hour.

Wherein, the elastic rubber is ternary ethylene-propylene rubber; the molecular weight of the high molecular weight polyisobutylene is 85,000; the molecular weight of the medium molecular weight polyisobutylene is 45,000; the elastic fibers are polyolefin elastic fibers; the inorganic powder is a mixture of calcium carbonate, barium sulfate, mica powder, and talcum powder in equal proportions; the anti-aging agent is a hindered phenolic binary antioxidant.

Embodiment 5

The elastic anti-corrosion adhesive in this embodiment comprises: by weight, 8 parts of elastic rubber, 5 parts of high molecular weight polyisobutylene, 25 parts of medium molecular weight polyisobutylene, 10 parts of elastic fiber, 60 parts of inorganic powder and 2 parts of anti-aging agent mixed at 115° C. for 3 hours.

Among them, the elastic rubber is butyl rubber; the molecular weight of high molecular weight polyisobutylene is 85,000; the molecular weight of medium molecular weight polyisobutylene is 45,000; the elastic fiber is polyester composite elastic fiber warp; the inorganic powder is calcium carbonate, barium sulfate, mica powder and Talcum powder is mixed in equal proportions; the anti-aging agent is a hindered phenolic binary antioxidant.

Comparative Example 1

The formula of the elastic anti-corrosion adhesive in this comparative example is the same as that of Embodiment 3, except that no elastic fibers are added.

Comparative Example 2

The formula of the elastic anti-corrosion adhesive in this comparative example is the same as that of Embodiment 3, except that no medium molecular weight polyisobutylene is added.

Comparative Example 3

The formula of the elastic anti-corrosion adhesive in this comparative example is the same as that of Embodiment 3, except that no elastic rubber is added.

Comparative Example 4

The formula of the elastic anti-corrosion adhesive in this comparative example is the same as that of Embodiment 3, except that no high molecular weight polyisobutylene is added.

Comparative Example 5

The formula of the elastic anti-corrosion adhesive in this comparative example is the same as that of Embodiment 3, except that 12 parts of low molecular weight polyisobutylene with a molecular weight of 10,000 are also added.

Comparative Example 6

The formula of the elastic anti-corrosion adhesive in this comparative example comprises: 5 parts of butyl rubber, 8 parts of high molecular weight polyisobutylene, 30 parts of medium molecular weight polyisobutylene, 15 parts of low molecular weight polyisobutylene, 40 parts of inorganic reinforcing filler calcium carbonate, 0.5 part of antioxidant 1010, 0.5 part of anti-aging agent 264, and 1.0 part of pigment phthalocyanine green. The preparation method is the same as that of Embodiment 3.

The elastic anti-corrosion adhesive made from Embodiments 1-5 was used to produce anti-corrosion adhesive tapes for wrapping and covering the surface of pipelines. Testing was conducted 24 hours later, and the specific test results are as follows:

| Test items | Embodiment 1 | Embodiment 2 | Embodiment 3 | Embodiment 4 | Embodiment 5 |
|---|---|---|---|---|---|
| Elongation at break | 157% | 180% | 201% | 188% | 130% |
| Resilience | 53% | 61% | 69% | 58% | 51% |
| Peel strength/N/cm | 3.5 | 4.8 | 4.2 | 5.7 | 3.3 |
| Peel coverage rate/% | 96 | 95 | 100 | 95% | 98 |

Based on the experimental results, the comprehensive performance of the elastic anti-corrosion adhesive made in Embodiments 1 to 5 is optimal and meets the requirements of ISO 21809-3 standard for tape peel strength ≥2N/cm and coverage rate ≥95%. Among them, Embodiment 3 is selected as the preferred formula for the elastic anti-corrosion adhesive tape.

Anti-corrosion adhesive tapes made from the elastic anti-corrosion adhesive prepared in Comparative Examples 1-6 were wrapped and covered on the surface of irregular-shaped pipes. Testing was conducted 24 hours later, and the specific test results are as follows:

| Test items | Comparative example 1 | Comparative example 2 | Comparative example 3 | Comparative example 4 | Comparative example5 | Comparative example 6 |
|---|---|---|---|---|---|---|
| Elongation at break | 108% | 203% | 125% | 162% | 159% | 136% |
| Resilience | 39% | 93% | 40% | 53% | 28% | 15% |
| Peel strength/N/cm | 2.3 | 5.5 | 3.3 | 1.8 | 2.5 | 2.1 |
| Peel coverage rate/% | 70 | 50 | 85 | 95 | 61 | 33 |

Based on the analysis of the experimental results above, compared to Example 3, Comparative Example 1 shows a significant decrease in resilience due to the absence of elastic fibers. Resilience corresponds to the self-tightening force of the adhesive layer, and the decrease in resilience leads to a reduction in the self-tightening force of the adhesive layer, resulting in decreased cold flow properties and poor bonding effectiveness with irregular-shaped pipeline surfaces, leading to decreased peel strength and coverage rate.

Since medium molecular weight polyisobutylene plays a primary role in initial adhesion and certain bonding and sealing effects in the entire adhesive structure, Comparative Example 2 shows a significant decrease in bonding coverage rate due to the absence of medium molecular weight polyisobutylene.

Comparing Comparative Example 3 with Embodiment 3 and Comparative Example 1, it is evident that resilience and elongation at break are the result of the combined action of elastic fibers and elastic rubber. The absence of elastic rubber also leads to a slight decrease in elongation at break and resilience of the adhesive, resulting in insufficient tightening force and inadequate coverage rate of the adhesive.

In Comparative Example 4, no high molecular weight polyisobutylene was added, and high molecular weight polyisobutylene provides resilience and significantly enhances its own cohesive strength. Therefore, compared with Example 3, the elongation at break and rebound rate are slightly reduced, and the peel strength is reduced at a certain level.

Comparing Comparative Example 5 with Embodiment 3, the difference lies in the addition of low molecular weight polyisobutylene. Low molecular weight polyisobutylene, being in liquid form, has a significant effect on reducing the elongation at break and resilience of the adhesive, leading to a substantial decrease in resilience. This prevents effective adhesion with the surface of irregular-shaped pipelines, resulting in a decrease in coverage rate.

Comparative Example 6 differs from Embodiment 3 by adding low molecular weight polyisobutylene while removing the amount of elastic rubber and elastic fibers. Compared to Comparative Example 5, the main difference lies in the removal of elastic rubber and elastic fiber. According to the experimental results, the performance of this Comparative Example is further reduced compared to Comparative Example 5. This further demonstrates the significant reduction in elasticity and resilience of the elastic adhesive due to the introduction of low molecular weight polyisobutylene. It also further proves the simultaneous enhancement of elasticity and resilience by elastic rubber and elastic fibers, which significantly benefits the use of elastic adhesives in irregular-shaped pipelines.

Embodiment 6

The elastic anti-corrosion adhesive tape of the present Embodiment, as shown in FIG. 1, comprises the following parts arranged sequentially: the first elastic anti-corrosion adhesive layer 1, the elastic reinforcement rib 2, the second elastic anti-corrosion adhesive layer 3, and the composite backing layer 4.

In the present invention, the first elastic anti-corrosion adhesive layer 1 and the second elastic anti-corrosion adhesive layer 3 are made of the elastic anti-corrosion adhesive prepared from any one of Examples 1-5. In practical use, the thickness of the first elastic anti-corrosion adhesive layer 1 is 1 to 2 mm, preferably 1.2 to 1.8 mm, and more preferably 1.4 to 1.6 mm. The thickness of the second elastic anti-corrosion adhesive layer 3 is 0.5 to 1 mm, preferably 0.6 to 0.9 mm, and more preferably 0.65 to 0.85 mm. The thickness of the first elastic anti-corrosion adhesive layer 1 is slightly greater than that of the second elastic anti-corrosion adhesive layer 3 because the first elastic anti-corrosion adhesive layer 1 contacts with the surface of the anti-corrosion workpiece, and a slightly larger thickness makes it easier to stretch and maintain integrity. In actual use, the thickness of the first elastic anti-corrosion adhesive layer 1 and the second elastic anti-corrosion adhesive layer 3 can be selected according to the specific requirements of use.

The elastic reinforcement rib 2 comprises: a plurality of tows, which are arranged between the first elastic anti-corrosion adhesive layer 1 and the second elastic anti-corrosion adhesive layer 3 in a parallel and spaced apart manner along the longitudinal direction of the elastic anti-corrosion adhesive tape. The elastic reinforcement rib 2 is positioned between the first elastic anti-corrosion adhesive layer 1 and the second elastic anti-corrosion adhesive layer 3, enhancing the overall structural strength of the elastic anti-corrosion adhesive tape. The elastic reinforcement 2 has high resilience, providing self-tightening force during use, allowing the anti-corrosion adhesive layer to penetrate more easily into the microscopic surface of the anti-corrosion workpiece, forming a solid anti-corrosion layer, filling gaps between the anti-corrosion adhesive layer and the workpiece, and improving sealing, thereby effectively isolating air and moisture from contacting the anti-corrosion workpiece, and enhancing corrosion resistance. Additionally, the excellent self-tightening force also helps to improve the bonding strength between the elastic anti-corrosion adhesive tape and the anti-corrosion workpiece, increasing the degree of integration, and thereby enhancing the peel strength of the elastic anti-corrosion adhesive tape. The tows comprises polyolefin elastic fiber bundles or polyester composite elastic fiber bundles, which are tough, have high resilience, and are easy to stretch, providing self-tightening force to the elastic anti-corrosion adhesive tape. The diameter of each fiber bundle is 0.3 to 0.8 mm, preferably 0.4 to 0.7 mm, and more preferably 0.5 to 0.6 mm. The spacing between the fiber bundles is 3 to 5 mm, preferably 3.5 to 4.5 mm, and more preferably 3.7 to 4.2 mm. The spaced arrangement of the fiber bundles provides good resilience to the elastic anti-corrosion adhesive tape without affecting its extensibility and also helps control costs. In actual use, the diameter of each fiber bundle and the spacing between the fiber bundles can be selected according to the specific requirements of use.

The composite backing layer 4 comprises a first backing layer 41 and a second backing layer 42. The first backing layer 41 and the second backing layer 42 are bonded together by a bonding layer 43, and the first backing layer 41 is positioned on the side of the second elastic anti-corrosion adhesive layer 3 away from the first elastic anti-corrosion adhesive layer 1. In the present invention, the composite backing layer 4 adopts a stretchable backing material, which can be tightly wrapped around the surface of the anti-corrosion workpiece through stretching to ensure good adhesion between the elastic anti-corrosion adhesive tape and the workpiece surface. In the present invention, the composite backing layer 4 adopts a double-layer structure, aiming to allow the anti-corrosion adhesive layer to penetrate into the surface of the backing layer without overflowing and to achieve self-fusion with the adhesive layer at the overlap area, thereby completely solving the problem of water seepage at the overlap area. Additionally, it is endowed with a paintable function, where the surface of the second backing layer 42 of the composite backing layer 4 can be coated with functional coatings as needed, thereby providing aesthetic, protective, and weather-resistant effects.

The first backing layer 41 is made of non-woven fabric with a weight of 50 g to 100 g, preferably ranging from 60 g to 90 g, and more preferably from 70 g to 80 g. The second backing layer 42 is made of non-woven fabric with a weight of 15 g to 30 g, preferably ranging from 17 g to 27 g, and more preferably from 20 g to 25 g. The weight of the first backing layer 41 is slightly greater than that of the second backing layer 42 because the first backing layer 41 is in contact with the surface of the second elastic anti-corrosion adhesive layer 3, and a slightly greater thickness corresponds to a slightly greater capacity to accept the penetration of the anti-corrosion adhesive layer. This allows the anti-corrosion adhesive layer to penetrate as much as possible into the first backing layer 41, reducing the amount of adhesive that can penetrate into the second backing layer 42 and thus minimizing overflow. In actual use, the weight of the first backing layer 41 and the second backing layer 42 can be selected according to the specific requirements. In the present invention, the bonding layer 43 is made of epoxy resin adhesive. The epoxy resin adhesive solidifies and becomes irreversible after being continuously cured at a temperature of 120 to 150° C. for a period of time. Epoxy resin adhesive has excellent stability, heat resistance, corrosion resistance, bending resistance, elasticity, impact resistance, and fatigue resistance. The formed composite backing layer 4 has good firmness, corrosion resistance, heat resistance, and long service life.

In the present invention, the elastic anti-corrosion adhesive tape further comprises an anti-adhesive isolation layer 5, which is located on the side of the first elastic anti-corrosion layer 1 away from the second elastic anti-corrosion layer 3. In this embodiment, the anti-adhesive isolation film includes: PET base film or PE base film. The thickness of the anti-adhesive isolation layer 5 is 0.05 to 0.1 mm, preferably 0.07 to 0.1 mm. The function of the anti-adhesive isolation layer 5 is to prevent the anti-corrosion adhesive tape from self-adhesion and contamination by dust, water vapor, and other pollutants in the atmosphere. The above description is only a preferred embodiment of the present invention and should not be construed as limiting the scope of the invention. Any modifications, equivalents, improvements, etc., made within the spirit and principle of the present invention should be included within the protection scope of the present invention.

The invention claimed is:

1. An elastic anti-corrosion adhesive, comprising the following components in parts by weight: 5 to 8 parts of elastic rubber, 3 to 5 parts of first polyisobutylene, 20 to 35 parts of second polyisobutylene different from the first polyisobutylene, and 5 to 10 parts of elastic fiber, 40 to 60 parts of inorganic powder and 1 to 5 parts of anti-aging agent, wherein:

the elastic rubber is a mixture of EPDM rubber and butyl rubber, the elastic fibers are a mixture of polyolefin elastic fibers and polyester composite elastic fibers, and the inorganic powder is a mixture of: calcium carbonate, barium sulfate, mica powder, and talc powder.

2. The elastic anti-corrosion adhesive according to claim 1, wherein the elastic rubber is the mixture of the EPDM rubber and the butyl rubber in equal proportions.

3. The elastic anti-corrosion adhesive according to claim 1, wherein the elastic fibers are the mixture of the polyolefin elastic fibers and the polyester composite elastic fibers in equal proportions.

4. The elastic anti-corrosion adhesive according to claim 1, wherein the inorganic powder further comprises: wollastonite powder and kaolin.

5. A method for preparing the elastic anti-corrosion adhesive according to claim 1, characterized in that it comprises the following steps:

mixing elastic rubber, first polyisobutylene, second polyisobutylene, elastic fiber, inorganic powder and anti-aging agent at a temperature below 130° C. for 1 to 4 hours to obtain an elastic anti-corrosion adhesive.

6. An elastic anti-corrosion adhesive tape, characterized in that it comprises: a first elastic anti-corrosion adhesive layer (1), an elastic reinforcing rib (2), a second elastic anti-corrosion adhesive layer (3) and a composite backing layer (4) arranged in sequence;

wherein the first elastic anti-corrosion adhesive layer (1) and the second elastic anti-corrosion adhesive layer (3) are made of the elastic anti-corrosion adhesive according to claim 1;

wherein, the elastic reinforcement rib (2) comprises: a plurality of tows, which are laid between the first elastic anti-corrosion adhesive layer (1) and the second elastic anti-corrosion adhesive layer (3) in a parallel and spaced manner along the longitudinal direction of the elastic anti-corrosion adhesive tape;

the tows comprise: polyolefin elastic fiber bundles or polyester composite elastic fiber bundles.

7. The elastic anti-corrosion adhesive tape according to claim 6, characterized in that the composite backing layer (4) comprises: a first backing layer (41) and a second backing layer (42), wherein the first backing layer (41) and the second backing layer (42) are bonded through an adhesive layer (43), and the first backing layer (41) is provided on the side of the second elastic anti-corrosion adhesive layer (3) away from the side of the first elastic anti-corrosion adhesive layer (1).

8. The elastic anti-corrosion adhesive tape according to claim 6, characterized in that the elastic anti-corrosion adhesive tape further comprises an anti-adhesion isolation layer (5), and the anti-adhesion isolation layer (5) is provided on the first elastic anti-corrosion adhesive layer (1) on the side away from the second elastic anti-corrosion.

9. The elastic anti-corrosion adhesive according to claim 1, wherein the inorganic powder is the mixture of the calcium carbonate, the barium sulfate, the mica powder, and the talc powder in equal proportions.

* * * * *